Oct. 20, 1970 J. D. ROSS ET AL 3,535,553

NON-ADDITIVE MIXER

Filed Oct. 9, 1967 2 Sheets-Sheet 1

INVENTORS
JOHN D. ROSS
OLE SKRYDSTRUP

Gerald J. Ferguson, Jr.
ATTORNEY

INVENTORS
JOHN D. ROSS
OLE SKRYDSTRUP
BY Gerald J. Ferguson, Jr.
ATTORNEY

United States Patent Office 3,535,553
Patented Oct. 20, 1970

3,535,553

NON-ADDITIVE MIXER

John D. Ross, Dollard des Ormeaux, Quebec, and Ole Skrydstrup, Montreal, Quebec, Canada, assignors to Central Dynamics, Ltd., Pointe Claire, Montreal, Quebec, Canada, a body corporate and politic Filed Oct. 9, 1967, Ser. No. 673,772
Claims priority, application Canada, Mar. 30, 1967, 986,627
Int. Cl. H03k *17/60*
U.S. Cl. 307—243 11 Claims

ABSTRACT OF THE DISCLOSURE

Circuitry for mixing one of two television signals to a common output load is disclosed wherein the greater of the two signals in absolute magnitude is transferred to the common load via a non-additive mixer. A differential amplifier for generating two adjustable reference signals is provided, the two television signals being respectively clamped at their back porches to the two reference signals. The two reference voltages are respectively derived from the two output terminals of the differentail amplifier, the voltage at one of the output terminals tending to change value in one direction whenever the voltage at the other terminal changes in the other direction. This tendency is prevented by a pair of diode clamps connected from a constant-valued voltage source to the two output terminals, respectively. The diode clamps fix the maximum value for both of the reference voltages to that value where they would be equal to each other if there were no diode clamps. Thus, when it is desired to mix to a first one of the two television signals, its associated reference siganl is increased by adjustment of a potentiometer connected to one of the input terminals of the differential amplifier. As the potentiometer is adjusted, the above-mentioned reference signal will increase in value until it reaches the value established by the diode clamps. Further adjustment of the potentiometer decreases the reference signal associated with the second one of the two television signals. Thus, the first of the television signals is faded in while the second is faded out in a transient-free manner.

BACKGROUND OF THE INVENTION

This invention relates to circuitry for switching one or the other of two signals to a common load and, in particular, to such circuitry for accomplishing this switching function in a transient-free manner.

Typically, it is necessary to fade one signal in while fading another out in the production of a television program. Thus, this invention is particularly applicable to the problem of television program production. Invariably conventional switching techniques introduce undesirable transients which detract from the picture quality during the switch-over from one picture to another.

SUMMARY

Thus, it is a primary object of this invention to provide improved circuitry for switching one or the other of two signals to a common output load in a transient-free manner.

It is a further object of this invention to provide an improved circuitry of the type described above which includes a nonadditive mixer.

It is a further object of this invention to provide an improved nonadditive mixer.

These objects are accomplished in accordance with one illustrative embodiment of the invention by providing means for generating two adjustable reference signals which are added to the television signals. Nonadditive mixing means are responsive to the two television signals plus their respective reference signals. Since the nonadditive mixer passes to its common output load, the greater in absolute magnitude of the two signals applied thereto, the television signal having the largest reference signal associated therewith will be passed to the common load.

Other objects and advantages of this invention will become apparent from a reading of the following detailed description of an illustrative embodiment.

DETAILED DESCRIPTION OF THE PREFERRED EMBODIMENT

For the purposes of this disclosure nonadditive mixing is defined as the mixing of two signals such that whichever has the greatest relative magnitude at any instant will appear at the output terminals of the mixing device. The device may be constructed to compare relative magnitude in either the positive direction or the negative direction.

Figure 1:
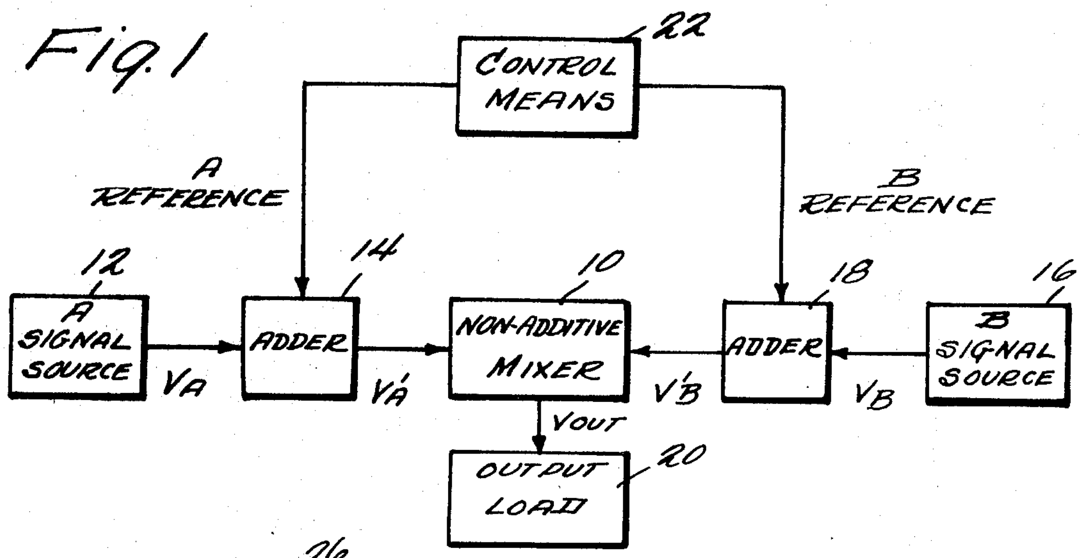
FIG. 1 is a block diagram of an illustrative embodiment of the invention.

Referring to FIG. 1, the relative magnitudes of the signals $V_A'$ and $V_B'$ are compared by nonadditive mixer 10 and its output $V_{OUT}$ is delivered to output load 20. The magnitude of $V_A'$ depends on the amplitude of the signal $V_A$ from the A signal source 12 and the magnitude of the A reference voltage delivered by adjustable control means 22 to adder 14. Similarly, the magnitude of input $V_B'$ depends on the amplitude of the signal $V_B$ from B signal source 16 and the magnitude of the B reference voltage delivered by the control means 22 to adder 18.

Figure 2:
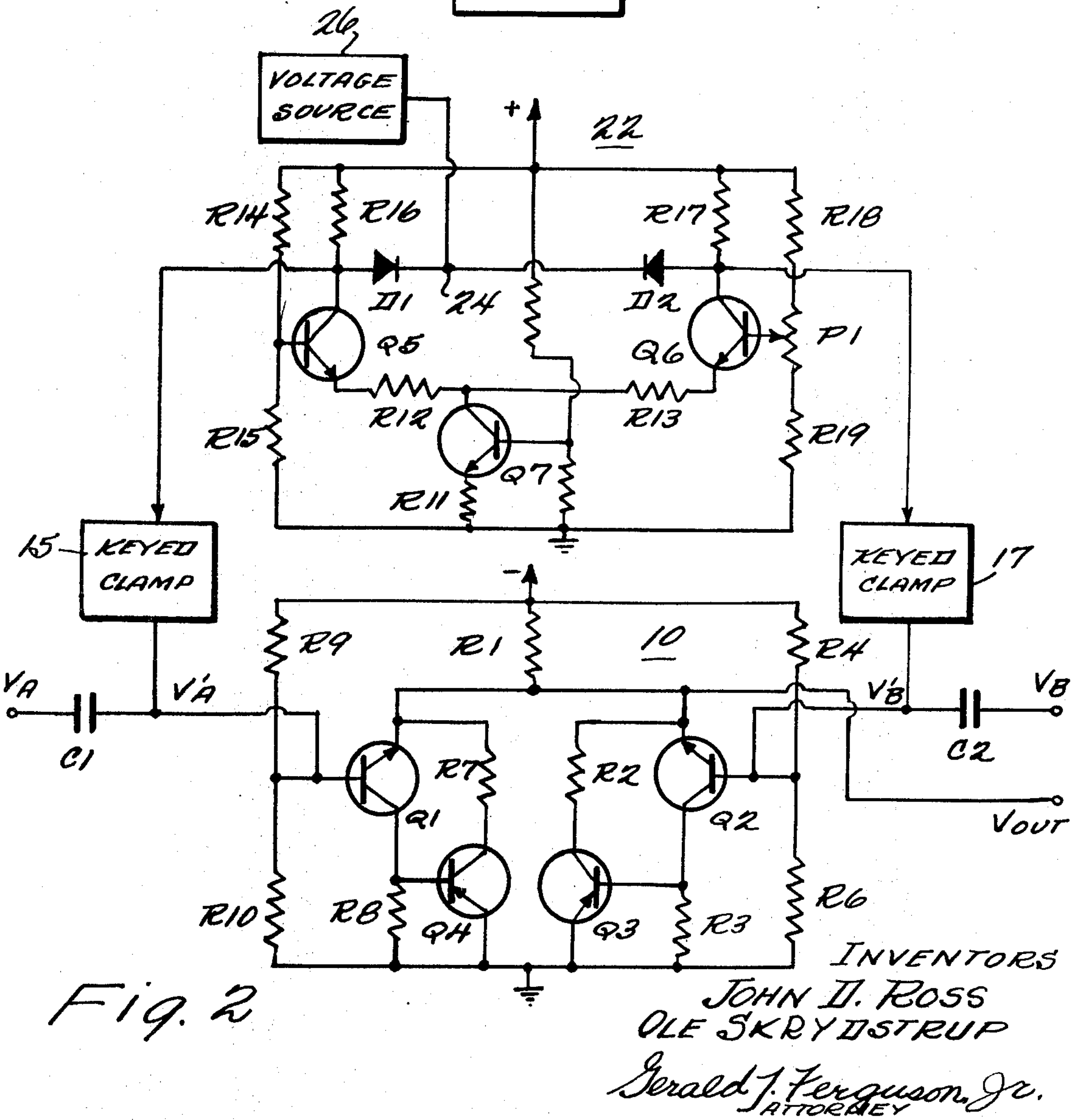
FIG. 2 is a combined schematic and block diagram of an illustrative embodiment of the invention.

Referring to FIG. 2 there is shown in more detail, the nonadditive mixer 10 which includes transistors Q1–Q4 and resistors R1–R10. $V_A'$, $V_B'$, and $V_{OUT}$ are respectively the two input signals and the output voltage. Whichever of $V_A$ and $V_B$ is more positive appears as $V_{OUT}$ provided the reference voltages effective at clamps 15 and 17 are equal. If the polarity of the transistors of mixer 10 is inverted, the most negative of $V_A$ and $V_B$ appears as $V_{OUT}$.

Assuming $V_A$ is more positive than $V_B$ and that the reference voltages effective at clamps 15 and 17 are equal, the operation of mixer 10 is as follows. Transistors Q1 and Q2 may be regarded as a difference amplifier wherein Q1 behaves as an emitter follower and exhibits the almost linear characteristic associated therewith and thus $V_A$ appears as $V_{OUT}$. When $V_B$ becomes greater than $V_A$, the base emitter junction of Q2 becomes forward biased thereby sharply forward biasing Q3. As Q3 conducts, the emitter potential of Q2 follows the potential at the base of Q2 by action of the feedback loop comprising Q2 and Q3. Thus $V_B$ appears as $V_{OUT}$. The action of Q1 and Q4 is similar when $V_A$ becomes greater than $V_B$. Although Q3 and Q4 are helpful in aiding the operation of the nonadditive mixer 10, they are not necessary and they may be eliminated if so desired. Their particular value arises when it is desirable to have a rapid switchover from $V_A'$ to $V_B'$ and vice versa.

Figures 4A, 4B:
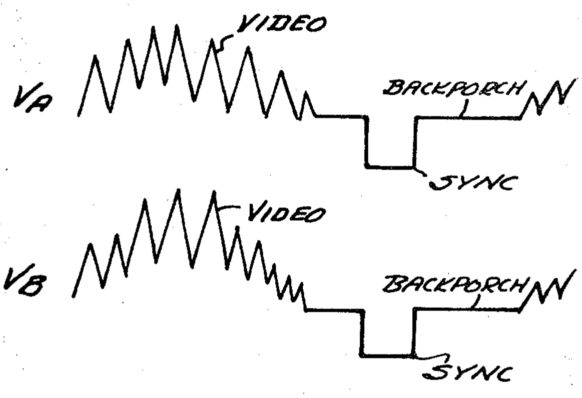
FIG. 4 shows typical waveforms of input signals.

In FIG. 4A, there is shown a typical waveform of the signal $V_A$, which may be a video signal. In FIG. 4B there is shown a typical waveform of $V_B$. In television applications, it is sometimes desirable to mix from one video signal to another. Thus, assuming $V_A$ is normally transmitted it may be desirable to mix to $V_B$. Each of the waveforms of FIGS. 4A and 4B includes a video portion, synchronizing pulse portion, and a back porch, as shown in the figures.

Keyed or synchronous clamps or a first pair of clamping means 15 and 17 are respectively connected to the bases of transistors Q1 and Q2 and are adapted to clamp the back porches of $V_A$ and $V_B$, respectively, to the reference voltages associated with clamps 15 and 17. Clamps 15 and 17 are connected to differential amplifier 22 which comprises transistors Q5–Q7, resistors R11–R19, adjustable potentiometer P1, diodes or a second pair of clamping means D1 and D2, and voltage or constant-valued signal source 26.

Figure 3:
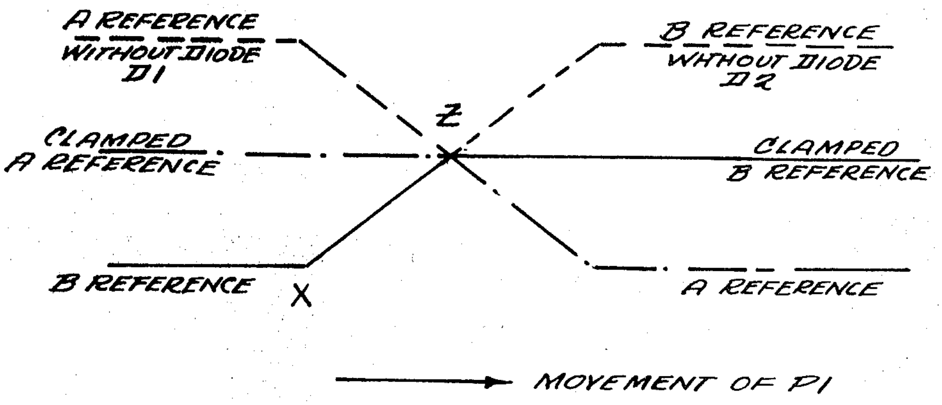
FIG. 3 is a graph illustrating the method of operation of the circuitry of FIG. 1.

The operation of the overall circuit will now be described. As stated hereinbefore, as long as $V_A'$ of FIG. 2 is greater than $V_B'$ of FIG. 2, $V_A$ will appear as $V_{OUT}$. Assume that the clamping reference voltage for $V_A$, which appears at the collector of Q5, is initially greater than the clamping reference voltage for $V_B$ at the collector of Q6, this being controlled by the setting of mixer control potentiometer P1. This condition is indicated at the left side of FIG. 3. Assume next that it is desired to mix $V_B$ into the output. When P1 is moved as indicated in FIG. 3 (downwardly in FIG. 2), the $V_B$ reference voltage begins to increase in value at point X (solid line in FIG. 3). Without the clamping action of D1, the $V_A$ reference voltage (as indicated by the dotted line in FIG. 3) would decrease in value with a corresponding increase in value of $V_B$. This results from the constant current action from Q7. However, because the $V_A$ reference is clamped to the voltage at terminal 24 as established by source 26, the $V_A$ reference (broken line in FIG. 3) does not decrease in value as the $V_B$ reference voltage approaches the $V_A$ reference voltage value. As long as the $V_A$ reference voltage remains greater than the $V_B$ reference voltage, the $V_{OUT}$ signal will essentially be $V_A$.

In order to eliminate low frequency transients due to effects of the varying control voltage during the switchover from $V_A$ to $V_B$, the reference voltage for $V_B$ is increased in value by P1 until it equals in value the clamped reference voltage for $V_A$. At this point, Z in FIG. 3, the picture content at any instant is determined only by the relative amplitude of the signals $V_A$ and $V_B$. Further movement of P1 in the same direction causes no further increase in the $V_B$ reference voltage since it is clamped by diode D2. However, the $V_A$ reference voltage at Q5 collector now decreases so that $V_A$ is smoothly eliminated from the output as can be seen in FIG. 3. At the limit of movement of P1 wiper, the signal $V_B$ appears as $V_{OUT}$. It is important that the clamping voltage established by source 26 be exactly at the cross-over point (see FIG. 3) for the $V_A$ and $V_B$ reference voltages if there were no clamping by diodes D1 and D2. It is also important that the difference between the A reference without diode D1 of FIG. 2 and the B reference be greater than the maximum signal excursion (black to white, if a television signal) of $V_A$ or $V_B$.

From the foregoing, it can now be seen how this invention accomplishes smooth, transient-free switching between two signals in a nonadditive mixer. If it is desired to sense the most negative of signals $V_A$ and $V_B$, then the comparator can easily be modified to achieve this result. In this case, the polarities of the voltages and transistors shown in FIG. 3 are reversed.

Numerous modifications of the invention will be apparent to those of ordinary skill in this art. It is to be understood, however, that the foregoing disclosure is to be considered exemplary and not limitative.

The embodiments of the invention in which an exclusive property is claimed are defined as follows:

1. Circuitry for switching one or the other of two signals to a common output load, said circuitry comprising:

adjustable control means for generating two reference signals and respectively adding said two reference signals to said two signals so that said one signal plus its associated reference signal may be greater in absolute magnitude than the other signal plus its associated reference signal for all instantaneous value of said other signal plus its associated reference signal, and nonadditive mixing means responsive to (1) said one signal and its associated reference signal and (2) said other signal and its associated reference signal for connecting to said common load the greater in absolute magnitude of (1) said one signal and its associated reference signal and (2) said other signal and its associated reference signal said adjustable control means including variable means for increasing one of said two reference signals and maintaining means for maintaining the value of the other of said two reference signals substantially constant until the value of said one reference signal equals the constant value of said other reference signal after which the value of said other reference signal decreases as said one reference signal is further increased whereby either said one signal and its associated reference signal or said other signal and its associated reference signal will be smoothly switched to said common load depending on which of said two signals said one reference signal is associated with.

2. Circuitry as in claim 1 where said adjustable control means includes a first pair of clamping means for respectively clamping said two signals to said two reference signals.

3. Circuitry as in claim 2 where said two signals are television signals and where said first pair of clamping means respectively clamp the back porches of said two television signals to said two reference signals.

4. Circuitry as in claim 2 where said adjustable control means includes differential amplifier means for generating said two reference signals, the first of the two reference signals tending to change in one direction whenever the second decreases in the other direction.

5. Circuitry as in claim 4 where said variable means includes adjustable potentiometer means connected to one of the inputs of said differential amplifier means for varying the two reference signals.

6. Circuitry as in claim 4 where said maintaining means includes a second pair of clamping means connected from a constant-valued signal source to the two output terminals of said differential amplifier means, respectively, for fixing the maximum value for the two reference signals to that value where they would be equal to each other if there were no second pair of clamping means.

7. Circuitry as in claim 6 where said second pair of clamping means are diodes.

8. Circuitry as in claim 6 where the difference between (1) the value of said first reference signal and (2) the value that said second reference signal would assume if its associated clamping means were not present is greater than the maximum peak-to-peak excursion of either of said two signals.

9. Circuitry as in claim 1 wherein said non-additive mixing means includes first and second emitter follower transistor means having a common emitter connection, the said one signal plus its associated reference signal being applied to the base of one of said transistor means and the said other signal plus its associated reference signal being applied to the base of the other transistor means, whereby the transistor means having the greatest signal in absolute magnitude at its base is transmitted to said common load connected to the said common emitters.

10. Circuitry as in claim 9 wherein said nonadditive mixing circuitry includes third and fourth transistor means respectively connected to said first and second transistor means for speeding the transition from said first transistor means to said second transistor means when one of said two signals plus its associated reference signal becomes greater in absolute magnitude than the said other signal plus its associated reference.

11. Nonadditive mixer circuitry comprising first and second emitter-follower transistor means having a common emitter connection, first and second signals being respectively applied to the bases of said transistor means, a load connected to the said common emitter connection, third and fourth transistor means respectively connected to said first and second transistor means in feedback loop connection so that either the first or second signal is rapidly switched to said load whenever it exceeds in absolute magnitude the other signal.

References Cited

UNITED STATES PATENTS 2,978,645 4/1961 Tedford -------- 328—154 XR

STANLEY T. KRAWCZEWICZ, Primary Examiner

U.S. Cl. X.R.

328—154